United States Patent [19]

Wood

[11] Patent Number: 4,701,988

[45] Date of Patent: * Oct. 27, 1987

[54] RELATING TO CUTTERS

[75] Inventor: Eric Wood, Wellingborough, England

[73] Assignee: Insituform International N.V., Netherlands Antilles

[ * ] Notice: The portion of the term of this patent subsequent to Apr. 17, 2001 has been disclaimed.

[21] Appl. No.: 714,794

[22] Filed: Mar. 22, 1985

[30] Foreign Application Priority Data

Mar. 24, 1984 [GB] United Kingdom ................. 8407707

[51] Int. Cl.$^4$ .......................... B23P 17/00; E03F 3/06
[52] U.S. Cl. ................................... 29/33 T; 166/55.2; 166/55.8; 409/143
[58] Field of Search ....................... 409/143, 132, 131; 29/40, 33 T; 166/55, 55.2, 55.7, 56, 55.8; 175/77, 78; 299/1, 39; 138/97

[56] References Cited

U.S. PATENT DOCUMENTS

| | | | |
|---|---|---|---|
| 2,679,770 | 6/1954 | Carter et al. | 408/35 X |
| 2,682,698 | 7/1954 | Berthiez | 408/35 X |
| 3,259,958 | 7/1966 | Lemelson | 408/35 |
| 4,167,362 | 9/1979 | Dietrich | 408/35 |
| 4,197,908 | 4/1980 | Davis et al. | 409/143 X |
| 4,442,891 | 4/1984 | Wood | 409/143 X |
| 4,577,388 | 3/1986 | Wood | 29/558 |

FOREIGN PATENT DOCUMENTS 3235060 3/1984 Fed. Rep. of Germany ...... 409/143

Primary Examiner—William R. Briggs
Attorney, Agent, or Firm—Fred Philpitt

[57] ABSTRACT

The invention describes a cutter which is for positioning in an underground pipe which is too small for man entry. The cutter is for cutting holes in previously applied pipe lining which cover lateral connections. The cutting must be controlled from above ground. Flexibility and positionability is achieved by mounting the cutter head at the free end of a boom body, the other end of which is mounted through a universal joint to a mounting so that the boom can swing in any direction. The cutter is controlled in its movement by coupling it to a master unit located and controlled above ground.

24 Claims, 4 Drawing Figures

RELATING TO CUTTERS

This invention relates to cutters. The cutter to which the invention refers is specifically for use in connection with the cutting of apertures in pipe structures. Thus, it is frequently required that a cutter should travel along the inside of a pipe structure and then, at a particular location, cut a hole in the wall of the pipe structure to establish a connection between the interior of the pipe structure and some other location. For example, it may be necessary to cut a hole in the pipe structure in order to establish communication between the interior of the pipe structure and a lateral pipe.

Such circumstances arise frequently in connection with a lining process now practised throughout the world and in which a flexible tubular lining is positioned inside a passageway to be lined and is shaped to the passageway surface by means of fluid pressure. The flexible lining includes a resin absorbent layer which is impregnated with, so as to be saturated in, a curable synthetic resin. The lining is held in position until the resin cures when the lining becomes a rigid shell or lining pipe lying against the passageway surface, when the shaping pressure can be removed and the lined passageway is ready for use. In such lining operations, frequently the lining bag is applied over and therefore blocks lateral pipe connections leading to the passageway and these must be re-opened, hence the need for cutter as indicated in the preamble.

As can be appreciated, when a lining described above has been applied, the location of the lateral connection to be re-established is not always easy, and they are normally identified visually by traversing a television or other camera through the lined passageway. The lateral connections can be "seen" in that the lining material "dimples" into the side connection aperture and this dimpling is seen as a shadow on the wall of the lining.

A number of cutter constructions have been proposed in order to achieve cutting away the lining to re-establish the lateral connections, but these suffer from a number of disadvantages one of which is that it is often difficult to observe the cutting operation with an underground TV camera. Also cutting bits have been used haphardly without reference to such variables as speed of rotation of the cutting bit for most efficient cutting, the type of resin used in the lining, and also the thickness of the lining, and to a lesser extent on the length of time which the resin has been allowed to cure. Firstly, these cutters have tended to be designed for use with a single bit, and if the bit becomes blunt or breaks, then the cutter must be removed from the passageway, which may be several meters under the ground, and a new bit applied thereto.

Again, in re-establishing side connections in relation to the lining method described above, it is frequently the case that uncured resin, water or other debris collects behind the lining in the side connection, and when the cutter bit penetrates the lining the discharge of fluent material from the side connection obscures a television or the like camera which is used to observe the cutting ooperation, and progress is difficult and slow. Furthermore, the cutter bit is usually mounted on an axis having only a limited degree of movement within the passageway so that it is not always possible to arrange for the axis of the cutter to lie at the most appropriate disposition for cutting the lining covering any particular side connection. There has not been provided an arrangement permitting the efficient cutting of these linings from an above ground location.

The present invention provides a cutter apparatus in several aspects having considerable flexibility and at least in the preferred forms the cutter apparatus overcomes the disadvantages of the existing cutters as indicated above.

In accordance with the present invention in a first aspect there is provided a cutter apparatus for cutting holes in a pipe structure from the inside of the pipe structure comprising a slave outlet unit having a mounting, a body carried by the mounting for movement relative thereto and a cutter head carried by the body, said cutter head having one or more cutters, and the body being mounted on the mounting for universal movement enabling the cutter, within the physical limitations of the pipe structure to be angled at any angular disposition in relation to the aperture to be cut, and master unit for location outside the pipe structure and manipulable by hand or by automatic control connected to the slave cutter so that the cutter head will duplicate the movement of the master unit.

The master unit preferable comprises a follower which follows a template simulating the aperture to be cut in the pipe structure, the follower being adapted to follow the template automatically by virtue of reaction against the template edge, and having a gear or roller or the like for rolling on the template edge. The master unit is adapted to be angularly positioned in relation to the template, either manually or by suitable control means, and the master and slave are connected so that he positioning of the master follower at a particular angle results in the slave cutter head being arranged at the same angle in the pipe structure.

The cutter head of the slave cutter preferably has three selectable positions, and in the respective positions, a different cutter bit is brought into operation. By this means, the head can be provided with three similar cutter bits so that when one cutter bit breaks or becomes blunt, then a second, and then a third cutter bit can be brought into operation. Alternatively, the three cutter bits can be of different construction for cutting under different conditions.

The speed of cutting of the slave cutter will follow the speed of movement of the master unit and is preferably variable, so that the speed of cutting of the slave cutter head can be varied.

The cutter head is preferably movable under power via several displacement motors which are coupled through joints and linkages to the cutter head, to provide for the universal movement of same.

The cutter body is preferably is encased in an air permeable jacket or bellows, and this in use is pressurised from a compressor located outside the pipe structure. This will ensure, for example in the case of cutting of side connections in the method mentioned above, that fluent material which flows into the pipe structure on establishing the side connection will not leak into and contaminate the interior of the cutter.

According to another aspect of the invention there is provided a cutter apparatus for cutting holes in a pipe structure from inside the pipe structure comprising a mounting, an elongate body carried by the mounting at one end for movement relative thereto in the nature of a boom, a universal joint between the mounting and body enabling the body to be pivoted in any direction but supporting the body in any adjusted position, and a cutter head carried by the free end of the body, said cutter head having one or more cutters, and being mounted on the body for sliding and turning movement enabling the cutter, within the physical limitations of the pipe structure to be angled to any angular dispostion in relation to the aperture to be cut.

By arranging for the mounting of the body in the nature of a boom through a supporting universal joint, a novel form of cutter which has considerable flexibility as to the position of the cutter head, results and the invention extends to such a cutter whether or not it is used in a master/slave arrangement.

An embodiment of the present invention will now be described, by way of example, with reference to the accompanying drawings, wherein.

Figure 2:
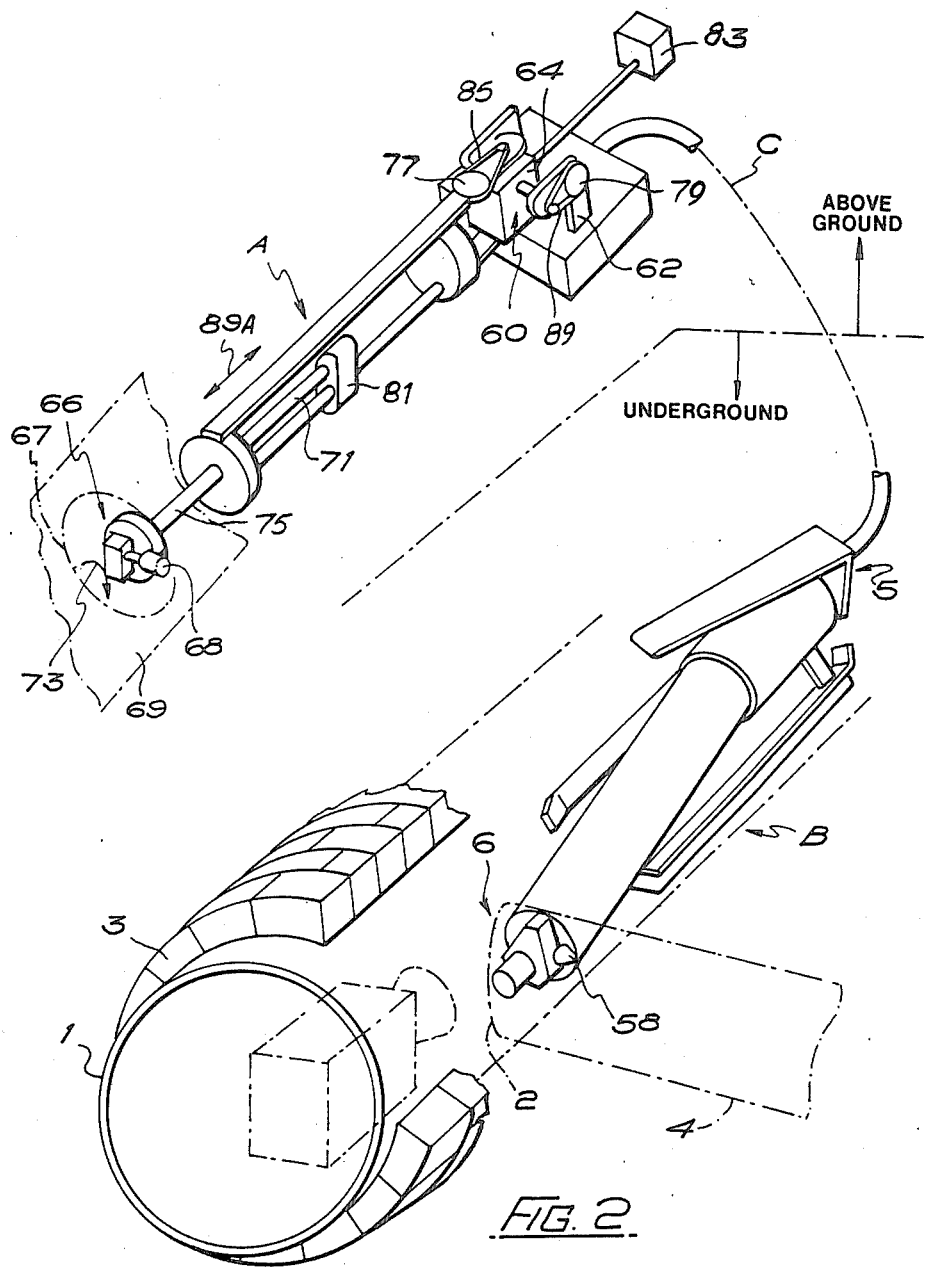
FIG. 2 is a diagrammatic perspective view, with parts cut away, for explaining the operation of the apparatus.

Referring to the drawings, in FIG. 2 the master unit is indicated by reference A, and the slave unit by reference B. The slave unit is shown incorporated in an underground pipe lining in order to cut an aperture 2 in the wall thereof, and is generally elongated in construction, and the purpose of cutting the aperture 2 in the lining 1 is to re-establish the connection between the lateral 4 and the passage 3. It is convenient to refer to the end 5 of the cutter unit B in the figures as the rear end, and to refer to the other end 6 as the front end, being the end which carries the cutter bit.

Figure 1:
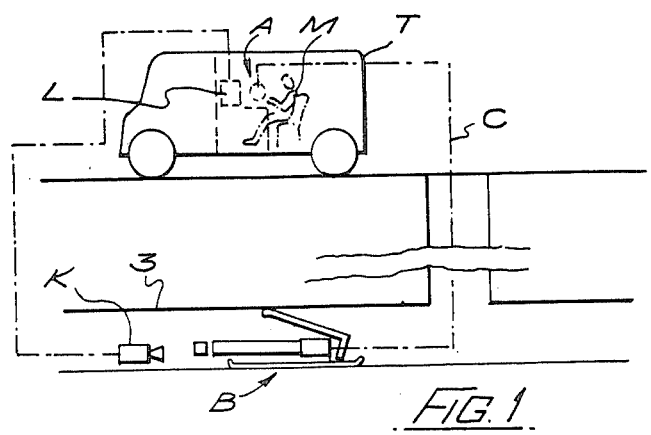
FIG. 1 is a diagrammatic side view showing the rear of the cutter apparatus.

If reference is made to FIG. 1, how the apparatus is used will be understood from this figure. The slave unit B is located in the passage 3 underground, whilst the master unit A is located in a truck T at ground level, the units being connected by an umbilical cable C providing electrical, pneumatic hydraulic connection between the units A and B and sources in the truck T. In the passage is a television camera K which is coupled to a television receiver L in the truck T so that an operator M can watch the cutting operation underground and can control same in the manner described hereinafter.

Figure 3:
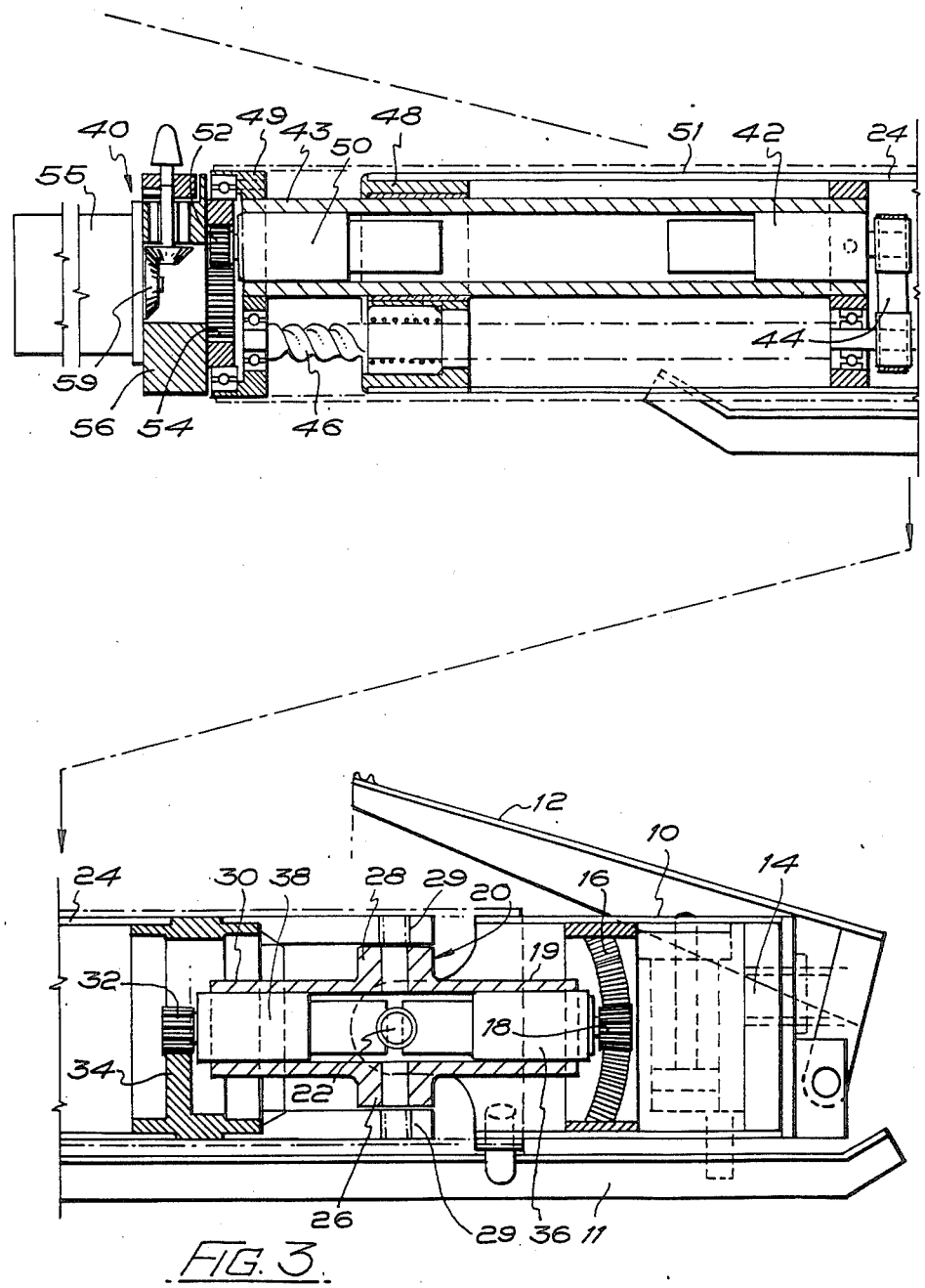
FIG. 3 is a sectional elevation of the above cutter unit.

Referring to FIG. 3 in detail, the cutter unit comprises a rear mounting 10 which is mounted on skids 11 by which the cutter may be supported as it is moved through the pipe structures, and on top is provided with a clamp shell 12 of arcuate section so as to fit when in the stowed position neatly in relation to the cutter unit which is generally circular in section, but which can be moved by means of a piston/cylinder device 14 to the locking position indicated in FIGS. 2 and 3, in which the shell 1Z engages the top of the inside of the pipe structure, thrusting the collar unit down on its skids 11 and locking the cutter unit in position. The rear body 10 is provided with an arcuate rack 16 which lies internally in a vertical plane when the cutter is in use, and engaging that rack is a pinion 18 carried on the end of one arm 19 of a cruciform joint member 20. The joint member 20 is pivotal on the rear body 10 about a horizontal axis 22 and pivotally connected to a central tubular cutter body 24 of the cutter unit by means of two opposed vertical legs 26, 28 of the cruciform body, and two bearings 29 defining an axis of pivoting which is at right angles to but intersects axis 22. On the fourth arm 30 of the cruciform body is a further pinion 32 which engages a rack 34 of arcuate form and which lies generally horizontally, the rack 34 being fast with body 24. Each of the arms 19, 30 carrying the pinions 18, 32, houses a stepping drive motor 36, 38 drivingly connected to the pinion, so that by driving of the motor 36 and pinion 18, the forward end of the central cutter body 24 is raised and lowered so that the forward end of the intermediate body 24 moves up and down in a vertical plane. By driving of the motor 30 and the pinion 32 the intermediate tubular body 24 is swung about a vertical axis so that the forward end of the intermediate body moves from side to side in the horizontal plane. By appropriate driving of these motors 36, 38 and pinions 18, 32 so the forward end of the intermediate body 24 can be made to travel in the nature of a boom in any direction within the physical limits of the cutter.

At the forward end of the intermediate body is a cutter head 40, and the cutter head 40 is adapted to have two further degress of movement relative to the body 24 in that in the intermediate body 24 lies a hollow sliding shaft 43 which houses a further motor 42 which is connected via a belt and pulley arrangement 44 to a lead screw 46. There is a plate 48 fixed in the body 24 through a bore of which shaft 43 slides and in another bore there is a threaded nut engaged by the lead screw 46. The forward end of lead screw 46 and shaft 43 are connected to a mounting plate 49 which carries the head 40. By driving of the motor 42 and the lead screw 46 the cutter head, with motor 42, transmission 44, screw 46 and shaft 43, moves forwardly or rearwardly in relation to the intermediate body 24.

Figure 4:
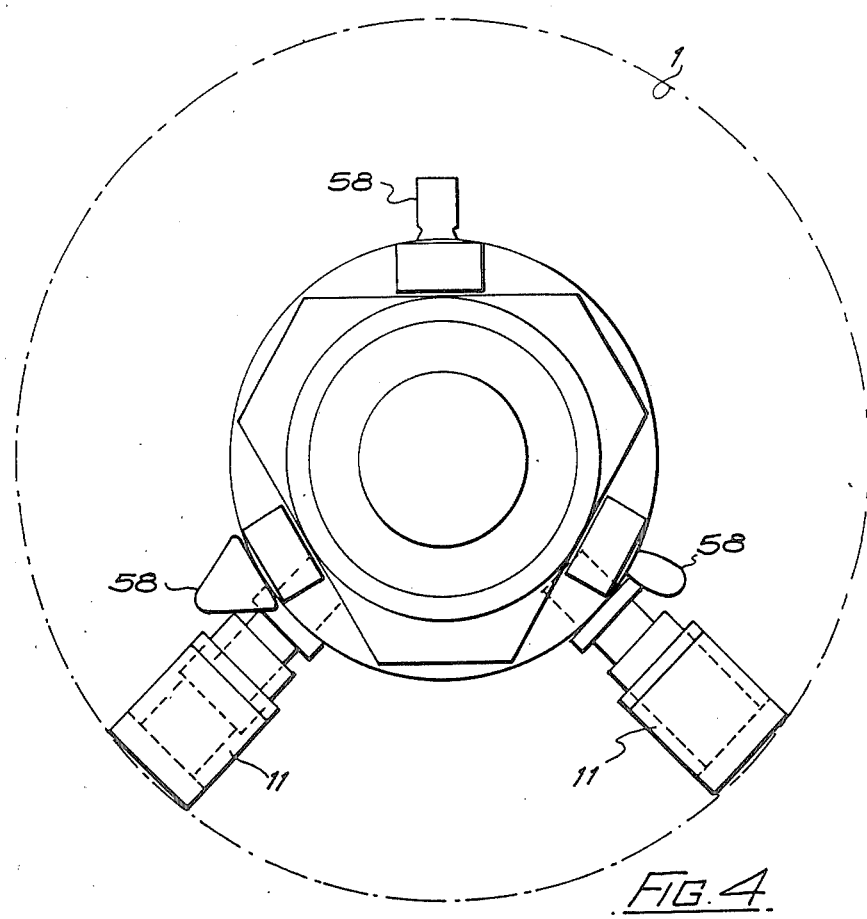
FIG. 4 is an end view of the cutter unit shown in FIG. 1.

The other end of shaft 43 houses a motor 50 having a pinion 52, and the pinion engages a rotatable annulus 54 in the cutting head 40. Rotation of the motor 50 effects rotation of a cutting head block 56 which is essentially triangular form as shown in FIG. 4, and has three cutter bits 58 of different profile extending from the respective faces thereof in a direction at right angles to the general axis 57 of the cutter unit.

The cutting block 56 mounts a motor 55 for rotating via bevel gears 59 the individual cutter bits 58 about their axes in order to effect the cutting of an aperture in the wall of the pipe structure, as will be explained herein. The cutter bits 58 may be driven by any suitable means such as by a small electric drive motor, or by air under pressure, or in fact the cutter bits may be constituted by high pressure water jets.

The cutter unit has a flexible jacket or sleeve 51 extending over the body 24 from the plate 49 to the mounting 10 and sealed thereto so as to dust, debris and other particles from entering the space contained within the sleeve 37 and contacting the moving parts of the cutter. To further prevent ingress of such particles, the interior of the sleeve may be flooded with compressed air supplied through cable C from a compressor in track T.

The various electrical and other connections to the cutter unit are made through the rear body through a connection aperture, via the single cable C, which may be a plastic coated cable embodying all the feed cables. The operation of the cutter is effected in a fashion now to be described.

The control of the cutter is by means of the master unit A which is shown most clearly in FIG. 2 and is constructed so as to be capable of executing the movements which will be executed by the cutter when in the pipe structure. The master unit comprises a universal joint 60 defined by a fixed bracket 62 corresponding to the rear mounting 10 of the cutter, a joint block 64 corresponding to the cruciform body 20 of the cutter, a follower head 66 corresponding to the cutter head 40, a follower wheel 68 corresponding to a cutter bit 58 and for following an aperture 67 in a template 69 corresponding to the apertures to be cut in the pipe lining, the follower head 66 being mounted on slides 71 to effect the sliding movement of the cutter head of the cutter in a forwards and rearwards direction. The inclination of the axis of rotation of the follower wheel 68 can be adjusted as indicated by arrow 73. The master unit A is additionally provided with a counter-balance weight 70 in order to facilitate the movement of the follower.

The master unit A has an arm 75 which can swing boom-like in that it is connected partially at one end to the block 64 and the master unit A further has four electrical potentiometers 77, 79, 81, 83 which provides electrical signals indicative of how the head 66 is being moved. Such signals are used to control the operation of the outer head 40 via cable C by controlling sleeve unit drive motors 1.

The potentiometer 77 is driven by a belt 85 from the horizontal axis of joint 60 giving a signal representative of the horizontal swing of the arm 75; the potentiometer 79 is driven by a belt 87 from the vertical axis of joint 60 giving a signal representative of the vertical swing of the arm 75; the potentiometer 81 is moved relative to the arm 75 by the linear movement (arrow 89A) of the head 66 giving a signal representative of the linear movement of the head 66', and potentiometer 83 is driven by the turning of head 66 as indicated by arrow 73 giving a signal representative of the turning of head 66 about an axis in the longitudinal direction of the arm.

The signal from the respective potentiometers 77-83 control the direction of the motors in the master cutter unit respectively so that the cutter bit 58 will faithfully move in a slave path as dictated by the movement of the follower head 66.

As the master A and slave B units are electrically coupled as explained so any movement of the master unit will be duplicated, and amplified or attenuated as appropriate depending upon the design by the slave unit so that the cutter 6 when in the pipe structure will effect the cutting of the aperture in the pipe structure at the appropriate position.

In order to use the equipment, it is necessary first of all for the person using the equipment to ascertain the position and shape of the aperture 2 to be cut in the pipe structure 1 and to arrange for the positioning of the slave cutter unit in the pipe structure accordingly. This done by the use of a television camera and monitor as explained. When the cutter is appropriately positioned, the cutting speed is chosen depending upon the characteristics of the material to be cut, and the corresponding template 69 is created for the master unit. The follower 68 of the master unit A is then caused to travel round the edge of the template aperture 67, and this can be done either manually or automatically, but in each case the axis of the follower roller will be set so as to lie substantially at right angles to the aperture being cut, and with this movement the cutting head in the cutter will automatically follow the same path but in lining 1 to cut aperture 2. The user will be able to select which cutting bit 58 is used for the cutting operation if as is preferred the cutter block 56 carries different cutter bits 58.

It is to be noted that the universal joint erected by the pinion, racks and uniform member between the mounting 10 and body 24, whilst it allows universal born movement of the body 24 when the motors are operative, when the motors are not operative the joint becomes sufficiently rigid to keep the body 24 in any position to which it is moved.

The speed of cutting is therefore under the control of the operator, and the cutter bit can be arranged at the most favourable angle for penetrating the wall of the pipe structure to give optimum cutting conditions.

I claim:

1. A cutter apparatus for cutting apertures in the side of a conduit from the inside of the conduit, which apparatus includes.
   (1) a slave unit for location inside the conduit comprising
      (a) a mounting member which is adapted to contact a portion of the interior of the conduit and permit movement of the slave unit within the conduit,
      (b) a body supported on said mounting member,
      (c) a cutter head carried by said body, said cutter head having at least one cutter,
      (d) universal movement means associated with said body which permits said cutter head, within the physical confines of the conduit, to be angled at any desired angular disposition in relation to the aperture to be cut, and
   (2) a master unit for location outside the conduit which is operatively connected to said slave unit, said master unit including
      (a) a follower having means to follow the outline of template that simulates the contours of an aperture to be cut in the conduit,
      (b) means associated with said follower so that manipulation of said follower along the contours of a template by either hand or by automatic control will result in said cutter head moving in a corresponding path.

2. A cutter apparatus according to claim 1 wherein said means on the follower includes a gear and roller for rolling on the edge of a template.

3. An apparatus according to claim 1 wherein the master unit includes means to angularly position the follower in relation to the template and the master and slave units are interconnected so that the positioning of the master follower at a particular angle results in the slave cutter head being arranged at the same angle in the conduit.

4. A cutter apparatus according to claim 1 wherein the cutter head of the slave cutter has three selectable positions, and in each of the respective positions a different cutter bit can be brought into operation.

5. A cutter apparatus according to claim 1, wherein the cutter head is movable under power by means of several displacement motors which are coupled through joints and linkages to the cutter head to provide for the universal movement of same.

6. A cutter apparatus according to claim 1 wherein the body of the slave has an air permeable jacket or bellows which in use is pressurized from a compressor located outisde the conduit.

7. A cutter apparatus according to claim 1 wherein said body is an elongated member mounted at one end through a universal joint to said mounting member, the other end being freely movable in the nature of a boom and carrying the cutter head.

8. A cutter apparatus according to claim 1 comprising a first rack on the mounting member a first pinion engaging said first rack, a first drive motor drivingly connected to said pinion, a universal joint yoke carrying said first motor whereby driving of said first motor effects pivoting of the body relative to the mounting member in a first plane, and further comprising a second rack on said body, a second pinion engaging the second rack, a second drive motor drivingly connected to said second pinion and carried by said yoke, said second rack lying in a plane at right angles to the plane containing said first rack, whereby driving of said second motor effects pivoting of said body relative to said mounting member in a second plane at right angles relative to said first plane.

9. A cutter apparatus according to claim 8 comprising a third motor movably carried by said body, a drive connector between said third motor and a feed screw, a threaded fixture of said body engaged by said feed screw, the cutter head being connected to said feed screw whereby driving of third motor effects longitudinal movement of said cutter head, third motor and head screw relative to the remainder of said body.

10. A cutter apparatus according to claim 9 comprising a fourth motor carried by said body, a gear head carried by said fourth motor, or annular on said cutter head engaged by said gear for turning the cutter head about an axis extending longitudinally of the body, said cutter head carrying several cutter bits extending radially therefrom, anyone of which can be operatively positioned for cutting a hole in a conduit.

11. A cutter apparatus according to claim 10 comprising an extensible protective sleeve on the body which seals said motor, feed screw and universal joint from ingress of particles.

12. A cutter apparatus according to claim 10 wherein the master unit comprises a movable arm whose movements are duplicated by the cutter head, and includes electric potentiometers which are varied as the movable arm is moved, and the said motors of the slave unit are electric stopping motors which are operated and controlled in dependence upon the variation of said potentiometers.

13. A cutter apparatus according to claim 12 wherein said potentiometers comprise a first potentiometer which is a rotary potentiometer adjusted by a drive belt which lies in a first plane and adjusts the first potentiometer by virtue of the swinging of the movable arm in a first plane, a second potentiometer which is a rotary potentiometer adjusted by a drive belt which lies in a second plane and adjusts the second potentiometer by virtue of the swining of the movable arm in a second plane, a third potentiometer responsive to the sliding of a free end portion of the arm in the direction of the length relative to another portion, and a fourth potentiometer responsive to the turning of a follower member at the free end of the arm about an axis lying in the direction of the arm, said four potentiometers respectively controlling said motors.

14. A cutter apparatus according to claim 1 wherein said mounting member includes a clamp member, a power drivable manipulable member operatively connected to the clamp member to clamp the slave unit to the conduit where it is located.

15. A cutter apparatus according to claim 14 wherein the mounting member includes skids for supporting the body when in the conduit.

16. A cutter apparatus for cutting apertures in a conduit from inside the conduit comprising a mounting member, and elongated body having a free end and carried by the mounting member at the other end for movement relative thereto, a universal pivot joint supporting said body and on said mounting member enabling said body to be pivoted in any direction and supporting the body in any adjusted position, a cutter head carried by the free end of said body, said cutter head having a plurality of different cutter bits that are positionable in a plurality of different positions to bring the respective bits into operative function, and means mounting the cutter head on the body together with means permitting sliding and turning movement enabling the cutter head, within the physical limitations of the conduit to be angled to any angular disposition in relation to the aperture to be cut.

17. A cutter apparatus according to claim 16 wherein said cutter head has three selectable positions and in each of the respective positions a different cutter bit can be brought into operation.

18. A cutter apparatus according to claim 16 wherein said cutter head is movable under power means of several displacement motors which are coupled through joints and linkages to the cutter head to provide for the universal movement of same.

19. A cutter apparatus according to claim 16 wherein said body has an air permeable jacket or bellows, and in use is pressurized from a compressor located outside the conduit.

20. A cutter apparatus according to claim 16 comprising a first rack on the mounting member, a first pinion engaging said first rack, a first drive motor drivingly connected to said pinion, a universal joint yoke carrying said first motor whereby driving of said first motor effects pivoting of the body relative to the mounting in a first plane, and further comprising a second rack on the body, a second pinion engaging the second rack, a second drive motor drivingly connected to said second pinion and carried by said yoke, said second rack lying in a plane at right angles to the plane containing said first rack, whereby driving of the said second motor effects pivoting of said body relative to said mounting in a second plane at right angles relative to said first plane.

21. A cutter apparatus according to claim 20 comprising a third motor carried by said body, a drive connection between said third motor and a feed screw, a threaded fixture of said body engaged by said feed scre, said cutter head being connected to said feed screw whereby driving of third motor effects longitudinal movement of said cutter head.

22. A cutter apparatus according to claim 21 comprising a fourth motor carried by said body, a gear wheel carried by said fourth motor, or annular on said cutter head engaged by said gear wheel for turning the cutter head about an axis extending longitudinally of said body.

23. A cutter apparatus according to claim 16 wherein said mounting member comprises a clamp member, a power drivable manipulable member operatively connected to the clamp member to clamp the cutter apparatus in the conduit when it is located.

24. A cutter apparatus according to claim 23 wherein the mounting member includes skids for supporting the body in the conduit.

* * * * *